Sept. 8, 1959     R. JONKE ET AL     2,903,388
PROCESS FOR INJECTION-MOLDING REINFORCED OR
STIFFENED PARTS IN PLASTIC MATERIAL
Filed Dec. 13, 1955
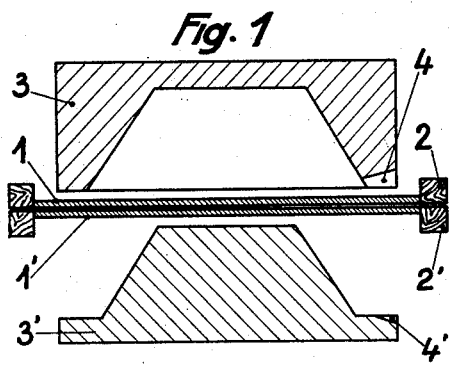
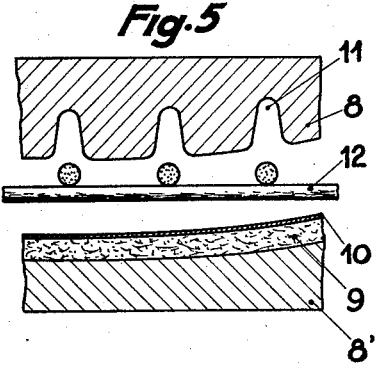
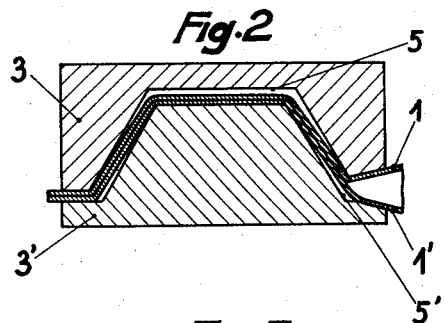
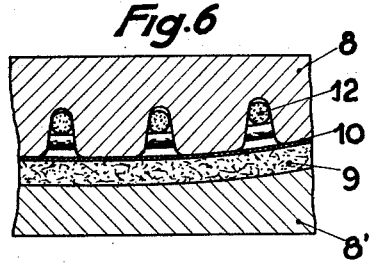
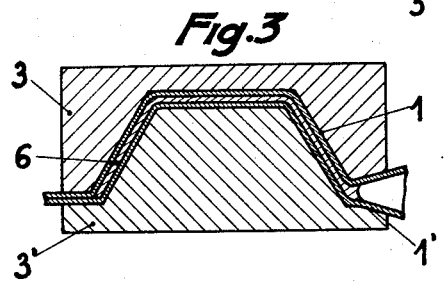
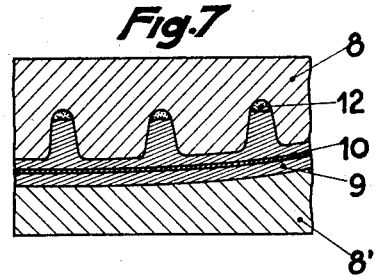
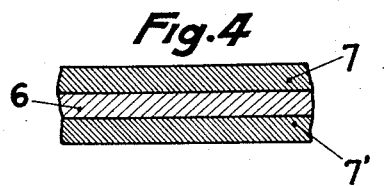
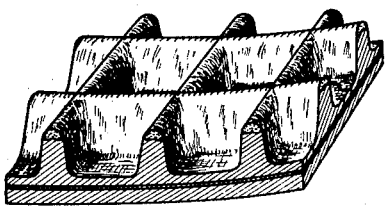
INVENTORS:
RICHARD JONKE,
JOSEF LINTNER
by Mestern & Kollin
ATTORNEYS

United States Patent Office 2,903,388
Patented Sept. 8, 1959

2,903,388

PROCESS FOR INJECTION-MOLDING REINFORCED OR STIFFENED PARTS IN PLASTIC MATERIAL

Richard Jonke, Vaucresson, and Josef Lintner, La Garenne-Colombes, France

Application December 13, 1955, Serial No. 552,893

Claims priority, application France December 14, 1954

2 Claims. (Cl. 154—110)

The principle of the reinforcement of parts in plastic material through incorporating fabrics, fibers, etc., and the principle of reinforcing such parts in providing them with ordinary or honeycomb ribs are known. It was however not possible, up to now, to manufacture such parts, especially when of large surfaces, by means of an injection-molding process.

In the process used for injection-molding parts which consists in injecting thermoplastic material, the molten resin is injected at a very high speed, i. e. under very high pressures, into a cold or tepid mold in order to avoid that the material should solidify during the filling period, by a premature cooling action. The high speeds of injection do not provide the possibility of loading the plastic material with a sufficient amount of fibers, nor of lining the inside of the mold, before it is filled, with reinforcing fabrics. It is further not possible to manufacture surfaces made of plastic material which are rendered rigid, by means of an efficient system of ribs, in order that they should be made self-bearing, since, where the ribs are provided, welding lines and fracture zones appear. The reinforcing zone furthermore stands out in the form of shrinkages on the smooth surface.

The method according to the invention provides the possibility of injection-molding reinforced or stiffened parts made of plastic material, whichever be their dimensions, either through incorporating fabrics therein, or by means of ordinary or honeycomb ribs, without being impeded by the above inconveniences.

According to the invention, the plastic material, in the liquid state, yet of a certain viscosity, is introduced into the mold, lined with one or more layers of a deformable fabric, at a speed which is sufficiently low so that no displacement of the fabrics should occur in the direction of the casting, care being taken that the plastic material should practically undergo no change in temperature during the filling operation. Such a result may be obtained, either in imparting the mold, during the filling period, with a temperature substantially equalling the temperature of the liquid plastic material, or in insulating the plastic material from the walls of the mold, by means of fabrics which also contribute to the reinforcement of the casting or molded part. Such a mode of operation is especially advantageous for casting liquid thermo-setting resins, of the "polyester" type. Welding lines are not discernible when using such a method. The viscosity of the plastic material is so chosen that the fabrics themselves should not yet be impregnated with the plastic material during the filling period, but should only be pressed against the wall or walls or shells of the mold.

After the mold has been completely filled, or after the space existing between the fabrics has been completely filled, such pressure is applied to the liquid plastic material, which is sufficient for obtaining the homogeneity of the molded part and for causing the plastic material to penetrate inside the fabrics, thus making the various fibers stick to one another. The liquid plastic material then comes into contact with the shells or inside walls of the mold.

The plastic material is thereafter solidified, either by cooling it, in case of a thermoplast, or by heating it, in case of a thermosetting resin of the polyester type.

This cooling or heating action of the plastic material may be obtained in bringing the liquid plastic material into contact with the cold or hot inside walls or shells of the mold after it has gone through the fabrics. Generally, the temperature of the mold must be adjusted. This is particularly necessary when the part to be molded is reinforced by means of ordinary or honeycomb ribs. In such a case, the solidification of the plastic material is caused to start on the smooth side of the part, either by cooling or by heating that part of the mold which is in contact with said side. As soon as a layer of plastic material has formed on the smooth side of the part which is sufficiently solid so that no deformation due to shrinkage may occur as the plastic material solidifies, the solidification is also caused to start on the ribbed side through cooling or heating the other part of the mold. It is advisable to maintain the pressure exerted on the plastic material during the solidifying period.

The grooves in the mold which correspond to the ribs of the molded part facilitate the repartition of the plastic material over the whole surface of the part to be molded, which is particularly advantageous when fabrics are used at the same time for reinforcing these parts.

In order to obtain the best yield of the process according to the invention, a mold should be used of the lowest possible thermic capacity, which allows rapid changes in temperature of its shells. The channels which are used for the heating and cooling media should therefore be distributed over the whole shell of the mold as regularly and as numerous as possible and at a small and substantially constant distance from the plastic material. A mold corresponding to these characteristics is described in copending application Serial No. 383,048, now Patent No. 2,865,821.

The process according to the invention allows the production of low pressure injection-molded parts of a small thickness, in particular parts with great surfaces which are reinforced of stiffened through incorporating fabrics, etc. and/or by means of systems of ordinary or honeycomb ribs. Such molded parts are of a particular interest for building parts, for automobile plastic bodies, for aircraft, for houses, furniture, etc.

In order that the nature of the invention may be more readily understood, reference is directed to the following description of the accompanying drawings, in which:

Figs. 1–3 are sections of a mold respectively open and closed after the introduction of fabrics to be impregnated and during the injection of the plastic material;

Fig. 4 is a section of a part of the casting obtained in the mold represented in Figs. 1–3;

Figs. 5–7 are sections of a grooved mold for the production of ribbed castings, and Fig. 8 is a perspective view of a part of the movable part obtained in the mold illustrated in Figs. 5–7.

In the example of Figs. 1–4, two deformable glass layers 1 and 1' are fixed on frames 2 and 2'. The mold is at a temperature of substantially 130° C. The glass fabrics 1 and 1' are introduced, by means of the frames 2 and 2', into the mold between both parts 3 and 3' thereof. The mold is closed thereafter and the glass fabrics 1 and 1' are thus tightly kept between the edges of the mold. The frames are withdrawn and the polyester liquid resin, already containing its catalyst or hardener and substantially at room temperature, is introduced, inbetween the layer of deformable fabrics 1 and 1' through the nozzles 4, 4', at so low a speed that the fabrics are not displaced in the direction of the casting. Due to the absence of pressure during the filling operation and to the relatively high viscosity of the plastic material, the latter does not penetrate the fabrics 1 and 1' and only passes between the latter while applying them against the walls or inner surfaces of the mold shells. As soon as the space between the layer of fabrics is thus filled, the plastic material encounters a resistance offered by the layer of fabrics and an increase of pressure is provided inside the mold, which causes the plastic material, still in the liquid state, to penetrate the layer of fabrics, thus causing the fibers to stick to one another and the plastic material comes into contact with the hot walls of the mold, which starts the hardening of the casting or molded part (Fig. 3). As soon as the part has acquired a sufficient stability of shape, it is withdrawn from the mold and the hardening completed inside an oven. The parts of fabrics projecting on the surface of the molded part are cut. As may be seen in Fig. 4, both faces 7, 7' of the casting are plastic material reinforced by glass fibers, whereas the central part 6 is made of plastic material only.

In the example illustrated in Figs. 5-8, it has been endeavored to render a molded part rigid by means of a system of ribs. To this effect, one of both half-molds 8 should be provided with a system of grooves 11. On the lower part 8' of the mold a layer of glass fibers 9 and a deformable glass fabric 10 are provided. Into the grooves 11 of the upper part 8 of the mold, glass-fiber cables 12 are introduced. The mold is closed as soon as both parts of the mold 8 and 8' (Fig. 6) are at a temperature above the melting point of the plastic material. A molten polystyrene, called "Styron," in the viscous state is introduced at a low speed; the layer or cushion of fibers 9 and the deformable fabric 10, as well as the cables of fabric 12 are pressed against the corresponding inside surfaces of the mold shells 8 and 8' by the plastic material. As soon as the cavity between the walls 8, 8' and the fabrics has been filled up with plastic material, the latter penetrates perpendicularly the fiber material, under the action of the pressure which is created inside the mold and it causes the fibers to stick to one another.

After the mold has been completely filled, the lower part 8' is cooled first, till the surface of plastic material with which it is in contact is cooled to such an extent that shrinkages may no more occur on that face of the molded part. It is only thereafter that the other part of the mold 8 is cooled down in order to completely solidify the molded part or casting. During the solidifying period, i.e. during the cooling period, the pressure exerted on the plastic material is maintained. It may be seen in Fig. 8 that only the outer parts of the molded part or casting are reinforced by means of glass fibers.

What we claim is:

1. A process for injection-molding parts in plastic material reinforced by incorporation of fabrics in a mold divided into two half-molds in contact along a substantially plane peripheric surface comprising placing two fabrics fittings between the inner walls of said half-molds, closing the mold, filling the plastic material in a viscous state into the closed mold between said fabrics fittings from a point of said peripheric surface of contact of said two half-molds, at a low speed, maintaining the temperature of said plastic material substantially constant during said filling and maintaining the pressure on said material sufficiently low that it does not penetrate said fabrics fittings during the filling period but serves to apply said fabrics fittings against the inner walls of said mold, the increase of pressure provided inside said closed mold through complete filling causing then said plastic material still in a liquid state to penetrate said fabric material and come into contact with said walls of said mold.

2. A process for injection molding parts in plastic material reinforced by incorporation of fabrics and by a system of ribs on one side in a mold divided into two half-molds in contact along a substantially plane peripheric surface, the inner surface of one of said half-molds being provided with a system of grooves corresponding to the system of reinforcing ribs to be provided on one side of said parts, which comprises placing two fabrics fittings between the walls of said half-molds, closing the mold, filling the plastic material in a viscous state into the closed mold between said fabrics fittings from a point of said peripheric surface of contact of said two half-molds, at a low speed, maintaining the temperature of said plastic material substantially constant during said filling and maintaining the pressure on said material sufficiently low that it does not penetrate said fabrics fittings during the filling period but serves to apply said fabrics fittings against the inner walls of said mold, the increase of pressure provided inside said closed mold through complete filling causing then said plastic material still in a liquid state to penetrate and come into contact with said walls of said mold, starting the solidification of the plastic material introduced into the mold by means of a thermic treatment, first on that side of the mold which is in contact with the smooth side of the part to be molded and continuing said treatment on that part of the mold which is provided with grooves, when said smooth side of the part is solidified, while further continuing, during the solidifying process, the introduction of the plastic material under pressure.

References Cited in the file of this patent
UNITED STATES PATENTS

| | | |
|---|---|---|
| 2,495,640 | Muskat | Jan. 24, 1950 |
| 2,642,920 | Simon et al. | June 23, 1953 |